United States Patent
Jolley

(10) Patent No.: US 6,205,882 B1
(45) Date of Patent: Mar. 27, 2001

(54) TILT RELEASE SYSTEM FOR A STEERING COLUMN

(75) Inventor: William A. Jolley, Keego Harbor, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/288,596

(22) Filed: Apr. 8, 1999

(51) Int. Cl.$^7$ ........................................................ B62D 1/18
(52) U.S. Cl. ............................ 74/493; 280/775; 74/501.6
(58) Field of Search ........................... 74/493, 543, 500.5, 74/501.6, 502.2; 280/775; 16/422, 426, 427, 430

(56) References Cited

U.S. PATENT DOCUMENTS

| 1,938,897 | * | 12/1933 | Frazier | 74/501.6 |
| 3,799,569 | | 3/1974 | Baker . | |
| 4,020,713 | * | 5/1977 | Cantley et al. | 74/500.5 |
| 4,033,158 | | 7/1977 | Chamberlain . | |
| 4,075,903 | | 2/1978 | Cornell . | |
| 4,300,407 | * | 11/1981 | Kopf | 74/493 |
| 4,392,670 | * | 7/1983 | Schultz | 280/775 |
| 4,633,724 | * | 1/1987 | Mochida | 74/501.6 |
| 4,649,769 | | 3/1987 | Venable . | |
| 4,783,884 | * | 11/1988 | Stricker et al. | 16/422 |
| 4,981,049 | | 1/1991 | Venable et al. . | |
| 5,036,942 | * | 8/1991 | Loewen | 280/775 |
| 5,239,889 | * | 8/1993 | Hancock | 74/493 |
| 5,426,994 | | 6/1995 | Khalifa et al. . | |
| 5,820,163 | * | 10/1998 | Thacker et al. | 280/775 |

FOREIGN PATENT DOCUMENTS

| 818941 | * | 4/1981 | (SU) | 74/493 |

* cited by examiner

Primary Examiner—David A. Bucci
Assistant Examiner—William C Joyce
(74) Attorney, Agent, or Firm—Lawrence J. Shurupoff

(57) ABSTRACT

A tilt release system includes a locking mechanism which retains a tiltable end portion of an elongated steering column of a vehicle in angularly adjusted position. The system includes a bracket mounted on a shroud of the steering column. A pivot pin is mounted on the bracket for rotation about a horizontal axis perpendicular to the steering column. A lever is mounted on a radial arm of the pivot pin. The radial arm of the pivot pin and the lever extend parallel to the steering column in a direction toward the rear of the vehicle when in a retracted position. The lever is connected to the locking mechanism by a cable. The lever pivots downwardly to release the locking mechanism. The lever has a frictional, sliding snap fit on the arm of the pivot pin so that if the lever is rearwardly impacted in a crash in a direction parallel to the axis of the steering column, the lever will slide off the arm toward the steering wheel, thereby preventing tilt release.

4 Claims, 4 Drawing Sheets

TILT RELEASE SYSTEM FOR A STEERING COLUMN

CROSS-REFERENCE TO RELATED APPLICATIONS

This application is related to co-pending U.S. patent applications Ser. No. 09/288,276, filed on Apr. 8, 1999, entitled "Tilt Release System for a Steering Column," and Ser. No. 09/288,416, filed on Apr. 8, 1999, entitled "Tilt Release System for a Steering Column."

BACKGROUND OF THE INVENTION

This invention relates generally to a tilt release system for releasing the locking mechanism of a tilt steering column of an automotive vehicle.

A tilt steering column allows an operator of a vehicle to adjust the height and angle of the steering wheel depending on the operator's stature, seat position and comfort. Typically, the steering wheel can be moved to an uppermost position to allow the operator or driver to get in and out of the driver's seat more easily.

A locking mechanism is provided to retain the steering column in an adjusted position. The locking mechanism must be released to adjust the steering column. Typically, the locking mechanism is released by rearward actuation of a lever on the steering column. If the vehicle is involved in a crash of sufficient magnitude to cause collapse of the steering column, there may be a rearward impact on the lever which will accidentally release the locking mechanism. When this happens, the steering wheel will move to its uppermost position due to the large return spring provided for this purpose. In its uppermost position, the steering wheel is in an unfavorable position with respect to the driver should the airbag accidentally deploy. Accordingly, it is highly desirable to maintain the steering wheel locked in a predetermined fixed position without tilting during a crash.

SUMMARY OF THE INVENTION

In accordance with the present invention, a lever is provided to release the locking mechanism for the steering column. The lever pivots downwardly rather than being actuated rearwardly along the axis of the steering column as is typical in current designs. Accordingly, if the lever of this invention is rearwardly impacted in a crash along the axis of the steering column, it will not release because release requires downward pivoting about a substantially horizontal axis extending laterally outwardly from the steering column.

Another feature of this invention is the provision of a sliding snap fit connection between the lever and its pivot pin. If the lever is axially impacted during a crash in a direction along the axis of the steering column, the lever will simply slide or snap off the pivot pin, thereby rendering tilt release impossible.

One object of this invention is to provide a tilt release system for the locking mechanism of a steering column having the foregoing features and capabilities.

Another object is to provide a tilt release system for a steering column which is of simple design and easy to operate.

These and other objects, features and advantages of the invention will become more apparent as the following description proceeds, especially when taken in connection with the accompanying drawings.

BRIEF DESCRIPTION OF THE DRAWINGS

FIG. 2A is an enlargement of a portion of FIG. 2.

DETAILED DESCRIPTION OF THE PREFERRED EMBODIMENT

Figure 1:
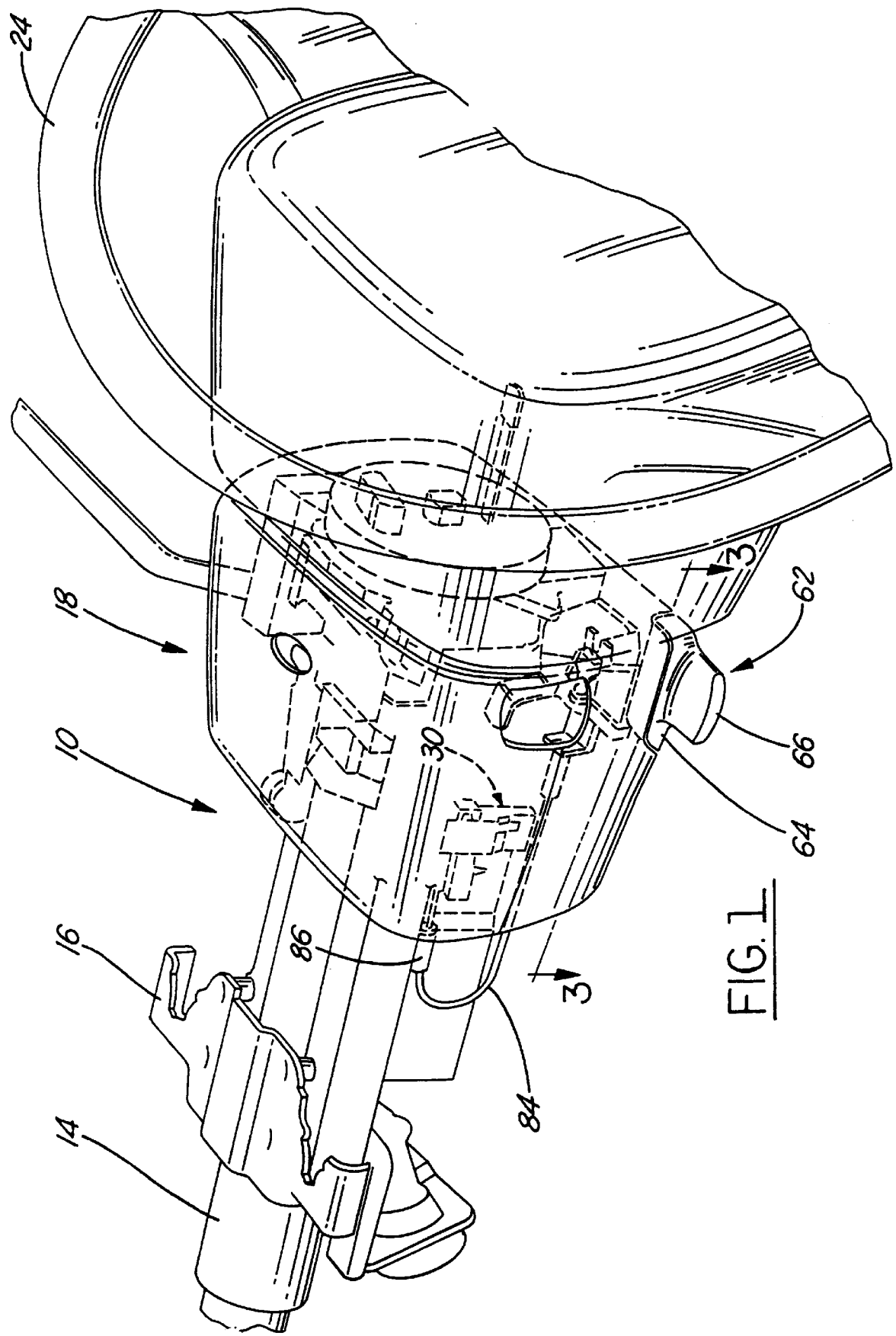
FIG. 1 is a fragmentary perspective view of a steering column having a tilt release system constructed in accordance with the invention.

Referring now more particularly to the drawings, the steering column 10 extends in an upward and rearward direction in a vertical plane lengthwise of the vehicle in which it is installed. The steering column 10 includes an elongated steering shaft 12 within an elongated tubular jacket 14. The jacket is secured to rigid vehicle support structure including the mounting bracket 16. The steering shaft 12 extends lengthwise within the steering column. The shaft 12 is connected at its lower end by a suitable coupler of known construction to a steering gear assembly (not shown) for steering the wheels of the vehicle.

The steering column has a tiltable upper end portion 18. The tiltable upper end portion 18 includes a tilt head 20 pivoted at 21 to the upper end of the shaft 12. A steering shaft extension 22 carried by the tilt head 20 has a steering wheel 24 on its upper end. A hollow shroud 26 is secured to the tilt head 20 and encloses the tilt head and shaft extension.

Figure 2:
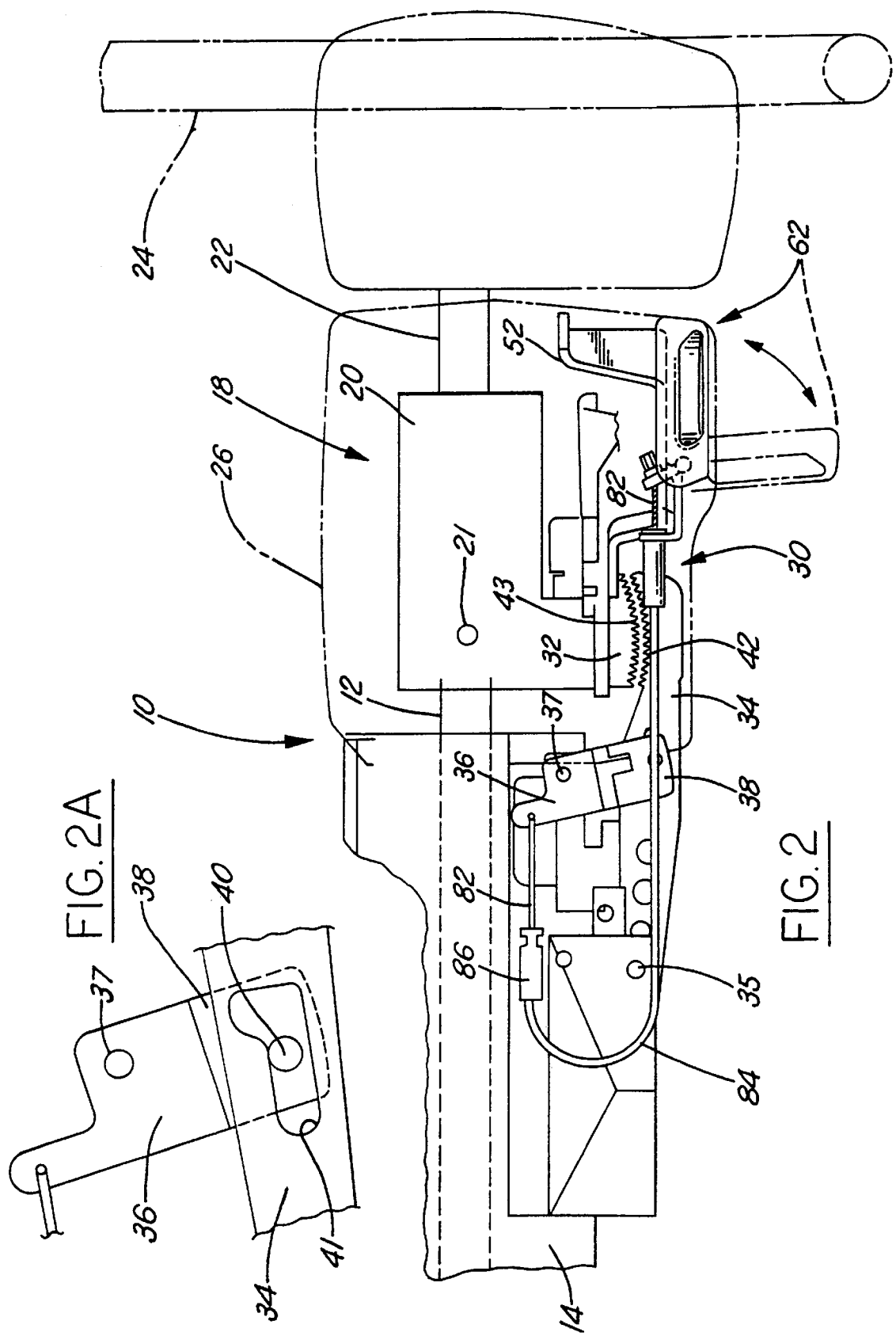
FIG. 2 is a side view of the structure shown in FIG. 1, with parts including a shroud in phantom to better illustrate the locking mechanism and the release system.
Figure 3:
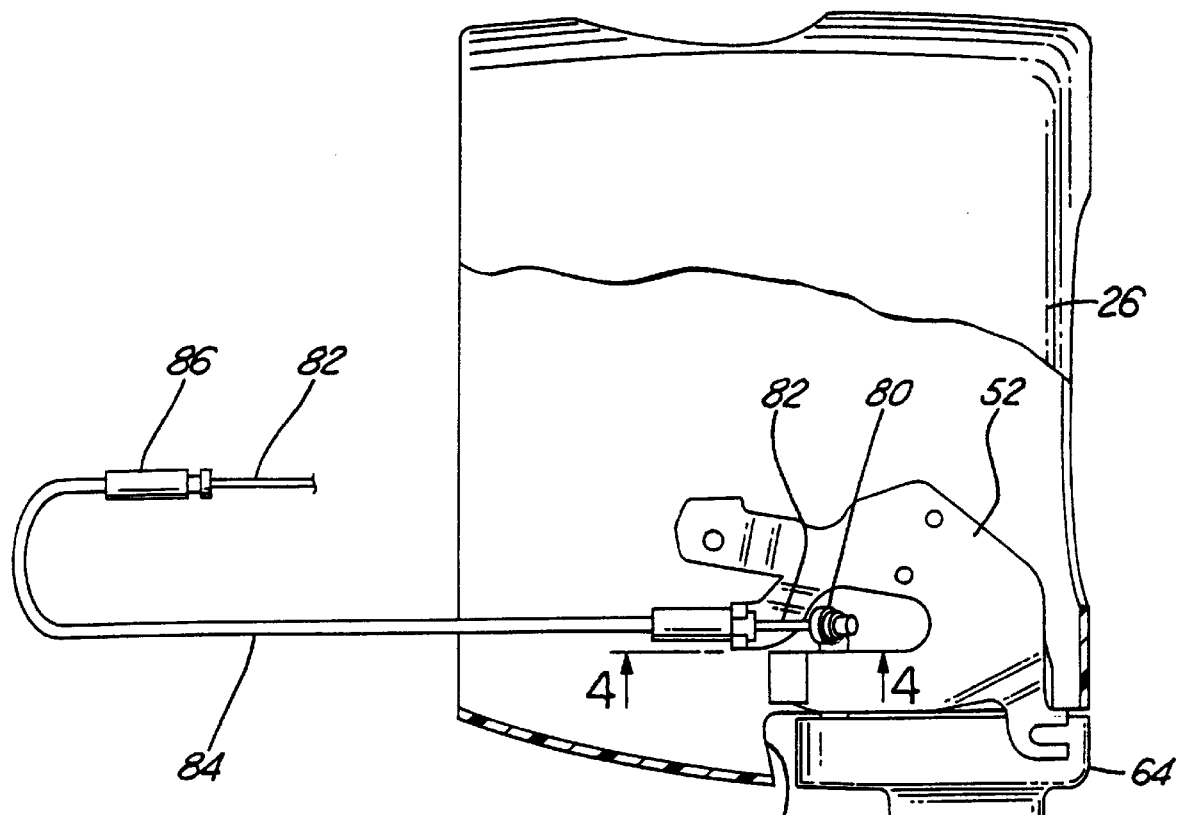
FIG. 3 is an enlarged top view showing the shroud partly broken away to illustrate the release system.
Figure 4:
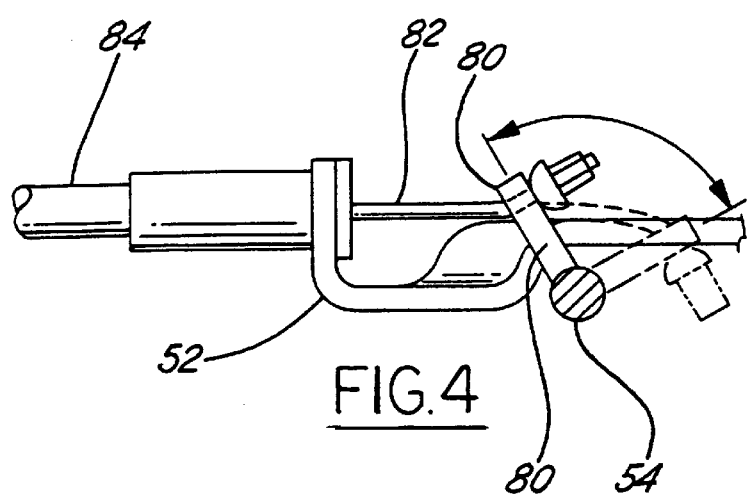
FIG. 4 is an enlarged fragmentary view of a portion of the release system, taken on the line 4—4 in FIG. 3.
Figure 5:
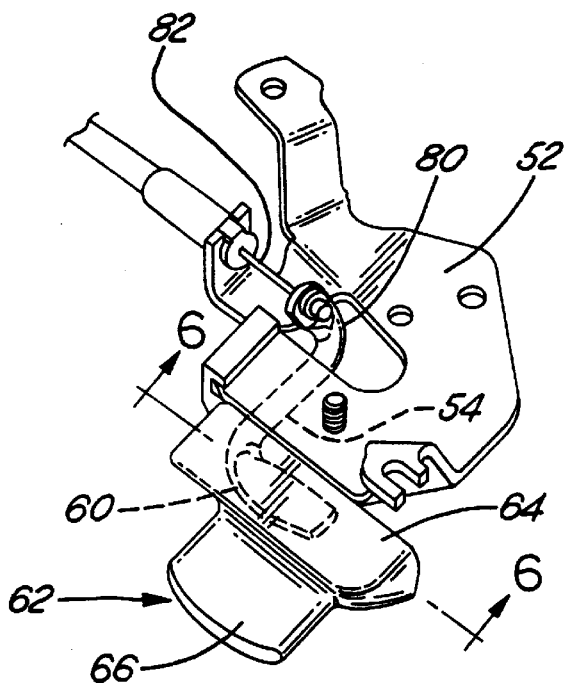
FIG. 5 is a fragmentary perspective view of the release system shown in FIGS. 3 and 4.
Figure 9:
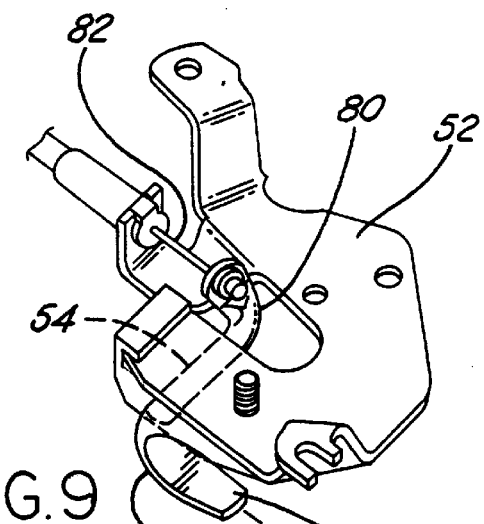
FIG. 9 is a view similar to FIG. 5 but showing the lever separated from the arm of the pivot pin.
Figure 6:
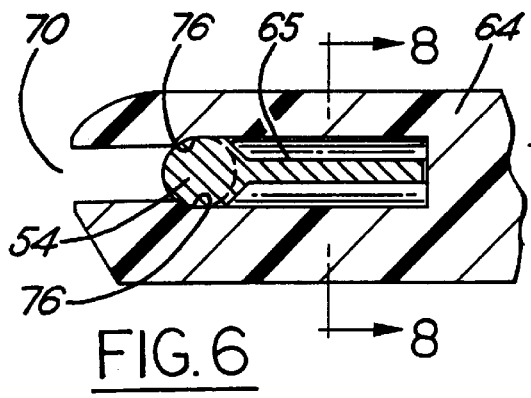
FIG. 6 is a sectional view taken on the line 6—6 in FIG. 5.
Figure 8:
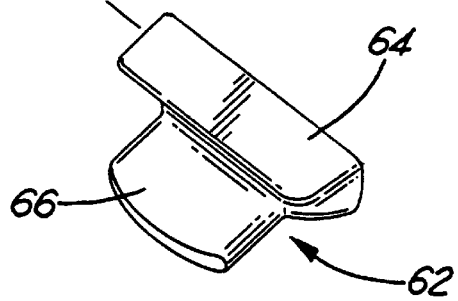
FIG. 8 is a sectional view taken on the line 8—8 in FIG. 6.
Figure 7:
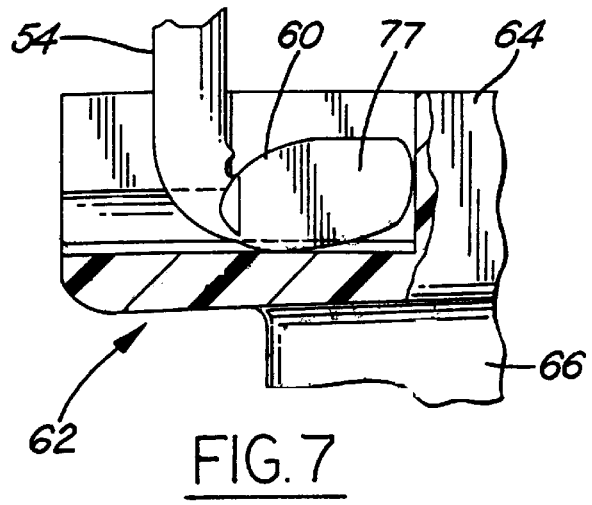
FIG. 7 is a fragmentary sectional view showing the connection between a lever and an arm of a pivot pin of the release mechanism.

The upper end portion 18 of the steering column is locked in angularly adjusted position by a locking mechanism 30 (FIG. 2). The locking mechanism includes a rack 32 secured to the tilt head 20 and a pawl 34 pivoted at 35 to the jacket 14. An arm 36 pivoted to the jacket 14 at 37 has a bifurcated end providing spaced apart members 38 which straddle the pawl. A pin 40 connects the members 38 and extends through a kidney-shaped slot 41 (FIG. 2A) in the pawl so that when the arm 36 is turned clockwise in FIG. 2 and FIG. 2A, the teeth 42 on the pawl engage the teeth 43 on the rack to lock the tilt head in angularly adjusted position. When the arm is turned counterclockwise, the pawl descends and retracts to disengage the rack. A spring (not shown) normally biases the arm 36 clockwise to engage the pawl teeth with the rack teeth. The arm is swung counterclockwise against the force of the spring by a tilt release system 50 which will now be described.

Referring to FIGS. 3–9, the tilt release system 50 includes a bracket 52 rigidly secured to the inside of the shroud 26. A cylindrical pivot pin 54 is mounted on the bracket for rotation. The axis of rotation of the pivot pin is horizontal and perpendicular to the steering column.

The pivot pin has a radial arm 60 at one end. A lever 62 is mounted on the radial arm. The lever 62 has a mounting portion 64 and a handle portion 66. The pivot pin 54 and mounting portion 64 of the lever 62 are inside the envelope of shroud 26. The handle portion 66 and radial arm 60 project laterally outwardly through a hole 68 in the shroud 26 and are outside the shroud.

The mounting portion 64 has an elongated cylindrical passage 65 which is open at the front end 70. Along one side of the passage is a groove 72 and along the opposite side of the passage is an open slot providing a second groove 74. The top and bottom of the passage 68 have confronting recesses 76 which are semi-cylindrical in shape with an axis perpendicular to the passage 65.

The radial arm 60 of the pivot pin is flattened throughout most of its length as indicated at 77. The arm 60 extends axially within the passage 65. The opposite side edges of the flattened portion 77 of the arm 60 have a frictional axially sliding fit in the grooves 72 and 74. The end of the pivot pin 54 adjacent to the radial arm 60 snaps into the recesses 76 (FIG. 6) to retain the lever 62 on the radial arm and prevent it from accidentally becoming separated. However, by applying pressure on the lever in a direction toward the free end of the radial arm, the snap fit will release and the friction fit of the edges of the flattened portion 77 of the arm 60 in the grooves 72 and 74 will release and the lever can be removed.

The pivot pin 54 has a radial arm 80 at the end opposite to the radial arm 60. The radial arm 80 is connected to one end of an elongated cable 82. The opposite end of the cable is connected to the arm 36 of the locking mechanism. A tubular sheath 84 slidably receives the cable. The sheath 84 is held by a support 86 on the steering column jacket 14 to direct the end of the cable rearwardly toward the arm 36. When the pivot pin 54 is rotated to turn the radial arm 80 from the solid line position in FIG. 4 to the broken line position thereof, the cable turns the arm 36 counterclockwise to release the tilt locking mechanism 30.

In the normal rotative position of the pivot pin 54, its radial arm 60 and the lever 62 thereon extend from the pivot pin parallel to the longitudinal axis of the steering column in a rearward direction. In order to release the tilt locking mechanism, the lever 62 and radial arm 60 are pivoted downwardly to a vertical position as shown in broken lines in FIG. 2 to pull on the cable and cause the arm 36 to release the pawl 34 from engagement with the rack 32 so that the upper end portion of the steering column can be pivoted and reset in another angular position or can be moved to its uppermost position if desired.

In the event of a frontal impact of sufficient magnitude to cause collapse of the steering column, there may be a rearward impact on the outwardly projecting handle portion 66 of the lever, but this will not have the effect of releasing the tilt locking mechanism, because a downward pivoting of the lever is required for that purpose. Moreover, any rearward pressure on the lever 62 may cause the lever to release from the radial arm 60 and separate therefrom, thus rendering it impossible to release the tilt locking mechanism.

What is claimed is:

1. A tilt release system for releasing a locking mechanism operable to retain a tiltable end portion of an elongated steering column of an automotive vehicle in angularly adjusted position comprising:

a bracket mounted on the steering column, a pivot pin mounted on said bracket for rotation about an axis extending transversely of the steering column, a lever mounted on said pivot pin to rotate with said pivot pin, an arm extending radially outwardly from said pivot pin to rotate with said pivot pin, means providing a connection between said arm and the locking mechanism to release the locking mechanism when the lever and pivot pin are rotated in one direction, wherein the steering column is disposed in a vertical plane and extends generally from front to rear of the vehicle, the bracket is mounted on the tiltable end portion of said steering column, the axis of rotation of said pivot pin is horizontal and perpendicular to the steering column and said pivot pin has a second radially outwardly extending arm, said lever is mounted on said second arm, said second arm and said lever extending parallel to the steering column in a direction toward the rear of the vehicle in a retracted position thereof and being pivotable downwardly to release the locking mechanism, and said lever is releasable from said second arm by rearward pressure thereon when said second arm and lever are in said retracted position, said lever has an elongated passage in which said second arm is slidably received, means for releasably retaining said second arm in said passage, and wherein said arms are at opposite ends of said pivot pin.

2. A tilt release system according to claim 1, wherein said means for releasably retaining said second arm in said passage comprises a friction fit of said second arm in said passage.

3. A tilt release system according to claim 1, wherein said means for releasably retaining said second arm in said passage comprises a snap connection between said second arm and said passage.

4. A tilt release system for releasing a locking mechanism operable to retain a tiltable end portion of an elongated steering column of an automotive vehicle in angularly adjusted position comprising;

a bracket mounted on the tiltable end portion of the steering column, a pivot pin mounted on said bracket for rotation about an axis extending transversely of the steering column, a lever mounted on said pivot pin to rotate with said pivot pin, an arm extending radially outwardly from said pivot pin to rotate with said pivot pin, means providing a connection between said arm and the locking mechanism to release the locking mechanism when the lever and pivot pin are rotated in one direction, wherein the steering column is disposed in a vertical plane and extends generally from front to rear of the vehicle, the axis of rotation of said pivot pin is perpendicular to the steering column and said pivot pin has a second radially outwardly extending arm, releasable means mounting said lever on said second arm, said second arm and said lever extending parallel to the steering column in a direction toward the rear of the vehicle in a retracted position thereof and being pivotable downwardly away from said retracted position to release the locking mechanism, said releasable means releasing said lever from said second arm in response to rearward pressure on said lever when said second arm and lever are in said retracted position, and wherein said arms are at opposite ends of said pivot pin.

* * * * *